United States Patent [19] | [11] 3,895,158
Gause et al. | [45] July 15, 1975

[54] COMPOSITE GLASS CLOTH-CELLULOSE FIBER EPOXY RESIN LAMINATE

[75] Inventors: Smith A. Gause; Marion C. Gray, Jr.; Wilbur R. Thomas, all of Hampton, S.C.

[73] Assignee: Westinghouse Electric Corporation, Pittsburgh, Pa.

[22] Filed: Aug. 15, 1973

[21] Appl. No.: 388,533

[52] U.S. Cl. ................ 428/220; 174/68.5; 428/236
[51] Int. Cl. ....... B32b 5/08; B32b 5/12; H05k 1/00
[58] Field of Search ........ 174/68.5; 161/DIG. 7, 70, 161/79, 82, 84, 85, 89, 93, 112, 152, 200, 184, 185, 263, 270

[56] References Cited

UNITED STATES PATENTS

| | | | |
|---|---|---|---|
| 2,417,586 | 3/1947 | Crosley | 156/163 |
| 3,242,027 | 3/1966 | Dowda | 156/277 |
| 3,318,063 | 5/1967 | Stone et al. | 161/200 X |
| 3,393,117 | 7/1968 | Zolg et al. | 161/93 X |
| 3,526,568 | 9/1970 | Kepple et al. | 174/68.5 X |
| 3,526,573 | 9/1970 | Kepple et al. | 174/68.5 X |
| 3,549,478 | 12/1970 | Gillery et al. | 161/185 |
| 3,617,613 | 11/1971 | Benzinger et al. | 161/93 X |
| 3,652,332 | 3/1972 | Brand et al. | 174/68.5 X |

FOREIGN PATENTS OR APPLICATIONS

| | | |
|---|---|---|
| 1,251,837 | 10/1967 | Germany |
| 1,739,055 | 12/1956 | Germany |

*Primary Examiner*—George F. Lesmes
*Assistant Examiner*—Alan T. McDonald
*Attorney, Agent, or Firm*—Alex Mich, Jr.

[57] ABSTRACT

Unclad and metal clad laminates are constructed by sandwiching a resin impregnated core of paper between epoxy resin impregnated woven glass fabric sheets. The paper is a water laid sheet of cellulose fibers, preferably wood cellulose or cotton linter fibers having an average length from about 0.5 to 5 mm. The laminates are used as substrates for printed circuits and printed circuit modules.

15 Claims, 3 Drawing Figures

COMPOSITE GLASS CLOTH-CELLULOSE FIBER EPOXY RESIN LAMINATE

BACKGROUND OF THE INVENTION

High pressure laminates are constructed by consolidating a plurality of resin impregnated sheet materials under heat and pressure. The laminates are available in diverse resin binder-sheet material combinations to meet diverse industrial requirements for physical, electrical and chemical properties. Inorganic sheet materials, e.g., those made from glass fibers, in combination with epoxy resin binders are extensively used in the field of printed circuitry because they provide the high order of physical, electrical and chemical properties necessary for reliable use in applications such as business machines, miniaturized industrial control equipment and military guidance systems. Sheet materials of woven continuous filament glass fibers impregnated with epoxy resin binder are employed to make high quality laminates that meet the rigid requirements for NEMA Grade types FR-4 and G-10 and the comparable Military Grade types GF and GE. These grades require the exclusive use of woven continuous filament glass cloth or fabric, presumably to provide the high flexural strength, volume resistivity, surface resistance, dielectric breakdown, arc resistance, blister resistance and bond strength and the low water absorption, dielectric constant, dissipation factor and, where applicable, flame resistance. The properties are essential for the preparation and use of printed circuit boards in rigorous applications and warrant the high cost.

The high physical properties or mechanical strengths, e.g., flexural strength, permit a high density of components to be mounted on the circuit board and contribute to the desirable or essential miniaturization requirements of modern electrical and electronic apparatus. The electrical properties under both dry and humid conditions provide the necessary reliability in long term service under adverse environmental conditions.

The described woven glass fabric-epoxy laminates may be typically clad with one or two ounce (per square foot) copper foil in one or both sides so that the copper clad laminates may be processed to generate printed circuits thereon by subtractive processes. The unclad laminates may be sensitized, with catalysts in the resin and/or in surface layers for example, and be suitable for generating printed circuits thereon by additive processes.

Several disadvantages attend the woven glass fabric-epoxy laminates. High cost, warping and twisting, poor punching, shearing, blanking and drilling quality with concomitant rapid tool wear are among the most significant disadvantages. The high cost is primarily due to the high cost of the woven glass fabric reinforcement, considered essential to the obtention of high physical properties such as flexural strength.

Warping and twisting are serious defects in many applications of printed circuits, particularly where a high component density is desired for miniaturization. Closely spaced printed circuit plug in units, for example, may not fit into close tolerance receptacles, or, if they fit, may contact and short against adjacent units. Warping and twisting may also adversely affect the preparation and/or processing of the printed circuit. Close fitting masks designed for high resolution or as contact plating seals may not function properly with a twisted or warped laminate. Warp and twist may be present in a laminate as it emerges from the press. A separate flattening operation may provide the desired flatness but adds to the cost. A more serious warping or twisting occurs during processing or fabrication of the printed circuit or module, particularly where the laminate is subjected to relatively severe environmental conditions. The high temperature of a solder floating operation where components are electrically connected to the circuit pattern may warp or twist the laminate. In these latter stages, flattening is not generally possible and a much more expensive unit has to be discarded. A high temperature plating operation in additive processes is another example of a rather severe exposure that can produce warping or twisting.

Another very significant disadvantage attending the woven glass cloth laminates is their poor drilling, punching, shearing and blanking quality. In the preparation of printed circuits it is necessary, for example, to provide numerous holes in the laminate, not only for mounting components but also to create conductive paths through the holes by depositing a conductive metal layer in and about the hole surface. Punching in all woven glass fabric laminate frequently creates cracking, haloing, delamination and fraying in the laminate so that punched holes may not be reliably suitable for plating. Drilling holes, an expensive alternative to punching, may consistently provide holes suitable for plating but rapid drill tool wear is inherent because of the abrasive nature of glass. That abrasive nature of glass also causes rapid wear of hole punches and other tools.

There are, of course, high pressure laminates which can be punched or drilled without the above-described disadvantages. Paper base laminates with either phenolic or epoxy resin binders may be successfully punched or drilled without rapid tool wear. Unfortunately, the physical properties, e.g., the flexural strengths, of these laminates are considerably lower than the glass fabric-epoxy binder laminates. The paper base laminates also have a higher water absorption than the glass fabric laminates and can therefore suffer a greater loss of electrical properties in humid environments. The paper base laminates are, therefore, employed in less demanding applications.

U.S. Pat. No. 3,617,613 describes punchable high pressure laminates wherein an epoxy impregnated non-woven glass fiber paper layer is sandwiched between sheets of epoxy impregnated woven glass fabric. This combination of essentially inorganic or all glass reinforcement and epoxy impregnant or binder, is disclosed as providing improved punchability and meeting the physical electrical and chemical property requirements for GE, GF, G–10 and FR–4 grade laminates. The glass fiber paper core layer is described as being relatively weak so that it must be supported by the stronger woven glass fabric sheet during resin treatment. While the described combination does provide improved punchability, it also appears that some difficulty is experienced with warping and twisting during processing and in consistently meeting the minimum flexural strength requirements. The rapid tool wear has not been materially reduced because of the abrasive nature of an all glass construction.

U.S. Pat. No. 3,499,821 describes a laminate wherein a lubricated cotton batt core is sandwiched between sheets of epoxy impregnated woven glass fabric. The cotton batt is first sandwiched between woven cotton cloth or paper layers so that the soft and fluffy batt is not destroyed or pulled apart when processed through conventional resin treaters. The cotton batt, apparently made by combing or needling relatively long cotton fibers, must also be stitched in a manner to impede exudation or extrusion of the binder during the curing step. It would appear that difficulties would be encountered in maintaining a satisfactory peel strength or foil bond because of the lubricant. Because of the expected uneven impregnation of the batt and the high resin and fiber flow in the press, a high degree of warping and twisting should be expected.

SUMMARY OF THE INVENTION

A relatively low cost high pressure laminate is formed by disposing a resin impregnated layer of cellulose fiber paper between layers of epoxy resin impregnated woven glass fiber fabric sheets and bonding the layers together into a unitary consolidated laminate under high pressure and temperature. The cellulose fiber paper may be a saturating grade of kraft paper made from water-laid fibrillated cellulosic wood and/or cotton linter fibers. The paper is sufficiently strong so that it may be separately treated with resin, dried and partially cured to the B-stage without auxiliary support. Copper or other metal foils may be bonded to one or more of the outer woven glass fabric layers as the laminate is made. The surface of unclad laminates may be catalyzed or sensitized for additive processes.

The laminates of this invention can be molded flat and are not warped or twisted after solder float or other operations as are all glass or all paper laminates. The drilling, punching, shearing and blanking quality of clad or unclad laminates in accordance with this invention is equivalent to paper base laminates. Punched holes are free of cracking, haloing, delamination and fraying so that both punched and drilled holes are suitable for plating. The improved drillability permits a greater number of laminates to be stacked for the drilling operation. The physical, electrical and chemical properties of composite laminates in accordance with the invention may be made to essentially meet the physical, chemical and electrical property requirements for GE, GF, G-10 and FR-4 types or designations, with particular ease in thicknesses of one thirty-second and one-sixteenth inch. Both the punch and drill tool wear is lower than that experienced with all glass laminates, even those partially constructed from glass fiber paper, because of the presence of the less abrasive cellulose fibers.

The laminates of this invention also provide the advantages of punchability, drillability, and lower tool wear without incorporating liquid lubricants into the core. Liquid lubricants, particularly those which are incompatible with epoxy resins (i.e., do not react with epoxy resin systems), can escape during molding and foul expensive caul plates. In any event, the lubricants can interfere with plating operations and with the obtention of high peel strengths when copper foil is bonded to the laminate.

DESCRIPTION OF THE PREFERRED EMBODIMENTS

In accordance with the present invention a high pressure laminate is made by sandwiching a layer of water-laid paper sheets consisting essentially of cellulose fibers between outer layers of a woven glass cloth. With an epoxy resin binder in the outer layers, the laminate provides an outstanding combination of properties that make it an outstanding substrate for thin metallic printed circuitry. Metal foil, such as copper or aluminum, may be bonded directly to one or both of the outer woven glass layers during the fabrication of the laminate, preferably without separate adhesive layers, to conveniently form metal clad laminates. By properly sensitizing the core and/or surface, additive processes may be employed to generate the circuits on the unclad laminates of this invention. While the principles of the invention have a broader application, it will be primarily described in terms of the most popular and widely used form, i.e., copper clad laminates having nominal thicknesses from one thirty-second to one-eighth inch with sheets of 1 or 2 ounce copper directly laminated to at least one woven glass surface during the construction of the laminate.

Lightweight, electrical and high pressure laminating grade glass fabrics may be employed. Such fabrics are available in a plain weave of continuous filaments, in a variety of styles and finishes, generally varying in thickness from about 1 to 7 mils and from about 0.6 to 6 oz./sq. yd. in weight. The fabric is available in substantial lengths on a roll. An ASTM Style 594-4, for example, has a weight of 5.80 ozs./sq. yd., a thickness of 7 mils, thread count of 42 × 32 (warp & fill), tensile strength of 250 and 200 (warp & fill) and is made from 75-1/0 yarn (warp & fill) in a plain weave. The finish should be compatible with the resin system employed.

Figure 1:
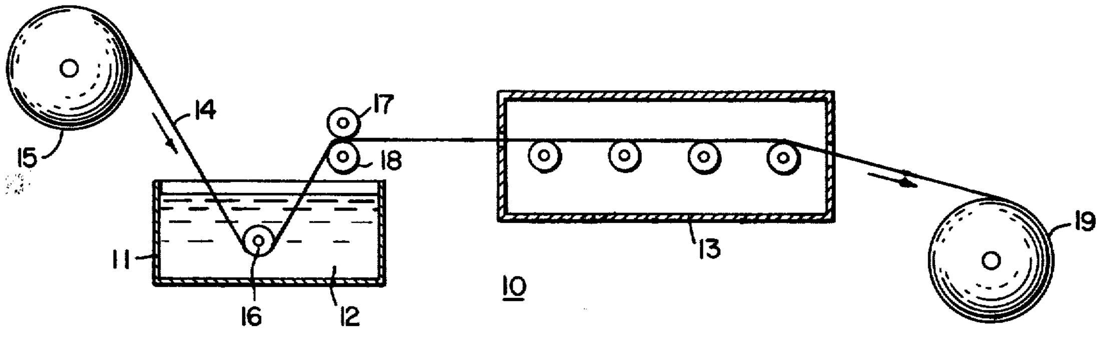
FIG. 1 is a schematic illustration of the treatment of glass fabric or paper.

Referring now to FIG. 1, there is illustrated a treater 10 comprising a tank 11 containing an epoxy resin impregnant 12 and an oven 13. Woven glass fabric 14 is taken off of the pay-off reel 15 and passed into the resin tank 11 where it is held immersed in the impregnant 12 by the roll 16. Emerging from the tank, the fabric passes between the rolls 17, 18 which remove excess resin, and is directed into the oven 13 where it is heated to cause the resin to partially cure to the non-tacky but fusible B-stage. After cooling, the B-stage resin impregnated fabric or prepeg is wound onto the take-up reel 19.

Among suitable epoxy resins are those popularly known as DGEBA epoxies, i.e., those derived from the reaction of epichlorohydrin and bisphenol A in an alkaline medium. Shell Chemical Company's Epon 1001 DGEBA epoxy resin is an example of a suitable commercially available resin. Other dihydric phenols may be used in combination with or in substitution for the bisphenol A. Epoxy novolacs may also be employed in partial or complete substitution for the bisphenol epoxies. The novolacs are prepared by reacting epichlorohydrin with phenol-formaldehyde condensates. In addition to phenol, alkyl phenols may be employed. Acetaldehyde, butyraldehyde and furfuraldehyde, for example, may be used in place of formaldehyde. Chlorinated phenols and chlorinated aldehydes may be used to impart flame resistance to the cured product. Indeed, chlorinated and particularly brominated epoxies are effectively employed to impart the flame resistance required by the GF and FR specifications noted above. Dow Chemical Company's DER 511 resin is an example of a suitable commercially available brominated epoxy resin. Antimony trioxide certain phosphates and other flame retarding additives may also be included in the impregnant to impart an additional degree of fire or flame resistance to the product.

It should also be understood that solvents and/or reactive or unreactive diluents may be employed to provide a suitable liquid state impregnant in the impregnating tank. The liquid composition should also include catalyst, accelerator and/or hardening or cross-linking agents to enable or aid the epoxy to first advance to the fusible B-stage and then later to the infusible or C-stage. Reactivity after B-staging should be sufficiently limited so that the wound substrate is not significantly advanced during any storage conditions or time. As will become apparent hereinafter, dicyandiamide is the preferrred hardener or catalyst for the epoxy impregnant in the glass fabric surface layers and chlorendic anhydride for the epoxy impregnant in the cellulose fiber paper core layer. It should also be understood that in the treating operation, the resin will penetrate into the interstices and also coat the fibers of the sheet. A resin rich surface may be provided, if desired. This applies to both the inner and outer layers.

It should, however, be understood that the epoxy resin impregnating system is free of liquid lubricating oils such as Mobisol "66" or Mobisol "44." Punchability and lower tool wear is obtained without such oils and without the disadvantages of such oils. Such oils, which appear to be unreactive, would be removed during typical vapor degreasing operations and the voids would provide for moisture absorption and consequent lower electrical properties. Plating through holes or to generate circuit patterns could be fouled by the oil. The absence of lubricating oils permits trouble free plating and vapor degreasing (trichloroethylene or perchloroethylene) of the laminates of this invention with a continued high moisture resistance.

The paper core of the substrate of this invention is made from a sheet of water-laid cellulose fibers which have been treated or fibrillated to provide a high degree of bonding between the fibers in the sheet and, therefore, provide sufficient strength so the sheet can be continuously treated without auxiliary support. Glass fibers, asbestos fibers and similar inorganic fibers do not produce strong paper because there is a lack of fibril bonding between the fibers. Properly beaten cellulose fibers, on the other hand, are fibrillated and capable of a high degree of interfiber bonding and can, consequently, be made into strong paper, sheets of which can be treated without auxiliary support.

There are various theories on the cohesive forces between the fibers of the paper, and while there may be other forces involved, it appears that the fibrillation of the fibers is the most important factor in permitting strong papers to be made under practical conditions. The primary wall surrounding the wood cellulose fiber is a deterrent to fiber bonding and must be removed. Rupture of the primary wall and partial removal exposes the secondary wall which, in a typical paper beating operation, if frayed out into fine fibrils that provide high strength bonds.

Wood cellulose fibers are the least expensive and most widely used fibers in paper making. Wood cellulose fibers are suitable and, indeed, the preferred fibers for the core sheets of this invention. The fibers generally run from about 0.5 to 5 mm. in average length. Mixtures of relatively long (0.5–2 mm. avg. length) hardwood and relatively short (2.5–5 mm. avg. length) softwood fibers may be employed and the various known pulping processes may be used in preparing pulp for the core sheets for this invention. This pulp, admixed with water, is laid onto a screen or other porous surface. The water is removed and a paper sheet is generated in a known manner. The respective paper making operations shoulld be designed to make an "open" sheet for rapid and thorough resin penetrations in the treater. Such "open" sheets are commercially known as saturating core stock papers.

All of the benefits of this invention may be realized only with papers whose fibers consist essentially of cellulose fibers such as wood cellulose fibers. Other cellulose fibers such as cotton linter cellulose fibers may also be water-laid to provide high strength sheets and may also be employed. Since fibrils cannot be generated from inorganic fibers, the presence of inorganic fibers is not desired and their complete absence is preferred. While they may be tolerated in small amounts to the extent that they do not affect the basic properties of the cellulose fiber paper sheets, their presence even in small amounts may, for example, increase tool wear. Additives that are typically employed in the manufacture of saturating grade cellulose papers may, of course be included. Cotton batting is made from cotton fibers several orders of magnitude longer than those described above, including the relatively long cellulose fibers. The cotton batting is also not a water-laid sheet and is typically combed or needled into a sheet-like form. It is not suitable for use as core sheets in this invention.

The cellulose fibers papers may be treated with phenolic resins and/or the above-described epoxy resins, in the manner described hereinabove for the woven glass cloth to provide sheets impregnated with B-staged resin. With the epoxy impregnated paper, however, an anhydride hardening or curing agent such as chlorendic anhydride is preferred to the dicyandiamide hardener preferably employed with the woven glass cloth. Surprisingly, the anhydride in the paper and the dicyandiamide, in the woven glass cloth do not interfere with the consolidation and cure of the B-staged sheets. This particular combination provides a more flexible, softer core than that provided by the use of a hardening agent such as dicyandiamide in the paper and results in an even further improvement in punch hole quality. Water absorption may be kept to a minimum by first treating the cellulose paper sheet with a low solids phenolic resin methanol-water solution to open the sheet, B-staging the phenolic resin and then treating the sheet with the anhydride cstalyzed epoxy resin in a second pass through the treater.

Figure 2:
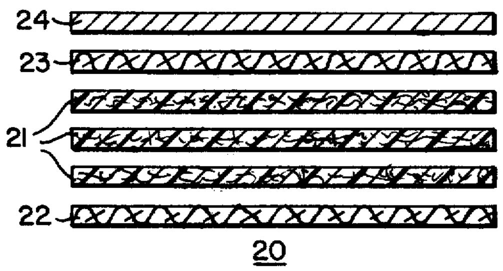
FIG. 2 is a schematic view of an assembly of sheets constituting a make-up for a high pressure metal clad laminate.

Referring now to FIG. 2, a make-up assembly 20 is composed of one or more paper core sheets 21 wherein the fibers consist essentially of cellulose fibers, surface sheets 22, 23 of a woven glass fabric and a one ounce per square foot copper foil sheet 24. The core and surface sheets are treated to a resin ratio (weight of solid B-staged resin to weight of the sheet without resin) of about 2.0 to 3.0. The paper is a water-laid saturating kraft wherein the fibers are a mixture of fibrillated hardwood and softwood and consequently have an average length from about 0.5–5 mm. The paper is sufficiently strong so that it may be treated in a typical horizontal treater without auxiliary support as illustrated in FIG. 1. The woven glass fabric is similarly treated with epoxy resin to a resin ratio from about 1.5 to 2.5. The make-up, together with a polyvinyl fluoride separator sheet on the side opposite the copper foil, is placed between pressing plates and inserted into a press having heated platens and cured at a pressure from about 500–1500 psi at about 150°–200°C for 1–1½ hours until the resins are advanced to the C-stage to form the high pressure copper clad laminate illustrated in FIG. 3.

Figure 3:
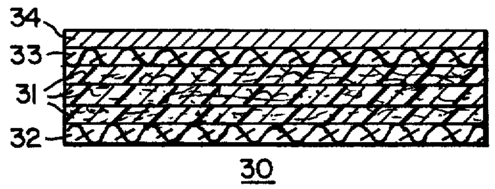
FIG. 3 is a cross-sectional view of a unitary consolidated high pressure metal clad laminate in accordance with this invention.

In FIG. 3, there is illustrated a unitary bonded combination or composite 30 having a core of the resin impregnated paper sheets 31, sandwiched between woven glass cloth outer layers 32, 33 and a copper cladding 34. The copper cladding may be omitted to provide an unclad laminate. Catalysts may be incorporated into the resins so that metal layers may be plated onto the entire surface or onto selected portions thereof in a predetermined circuit pattern. A separate catalyzed adhesive layer may be deposited on a catalyzed or uncatalyzed unclad laminate. Aluminum foil may be used in place of the copper foil. It may be useful to employ a sacrificial aluminum foil layer with a phosphoric acid anodized surface to provide an improved bonding surface for additive circuits. As is well know, an electroless copper strike may be first deposited on the catlyzed surfaces, including the catalyzed or sensitized surfaces of through holes, and thicker copper or other conductive metals may be deposited over the strike. The laminates of this invention may be advantageously employed in a variety of printed circuit fabricating techniques.

EXAMPLE 1

A 3 foot wide roll of water-laid saturating grade wood cellulose paper of heretofore described fibrillated hard and softwood fibers having a nominal thickness of 20 mils, a nominal Mullen of 35 psi (TAPPI–403) a density of 6–7 pounds/Pt. and a nominal porosity of 2 (TAPPI–T452) is first continuously passed (without an auxiliary support sheet) through a methanol-water solution of phenolformaldehyde resin (Union Carbide's Bakelite BBL–3913) containing about 20 percent solids. The impregnated paper passes through squeeze rolls and into heating zones from about 200°–300°F until the phenolic resin is B-staged. Only a small amount of phenolic resin is added (resin ratio about 1.1–1.2).

The lightly impregnated paper is treated a second time. It is passed through about a 50 percent solids solution of epoxy resin (Epon 1001–A–80; Shell Chem. Co.) and chlorendic anhydride in toluol with additives for flame resistance. The phenolic and epoxy resin impregnated paper passes through squeeze rolls and into heating zones from about 250°–300°F until the epoxy resin is B-staged. A larger amount of epoxy resin (resin ratio about 2.2–2.8) is added in this second treating step. The prepreg paper is cut into sheets about 3 ft. × 8 ft. and is later employed as core sheets.

A 3 foot wide roll of ASSTM Style 594–4 (Clark-Schwebel Fiber Glass Corp. Style 7628) woven glass fabric having a nominal thickness of 7 mils is continuously passed through a solution of brominated epoxy resin (Epon 1045, Shell Chemical Co. or DER–511, Dow Chemical Co.) containing dicyandiamide as hardener and benzyl dimethylamine as accelerator. The impregnated glass fabric passes through squeeze rolls and into heating zones from about 225°–425°F until the epoxy resin is B-staged. A resin ratio from about 1.6–1.9 may be employed. The pre-preg woven glass fabric is cut into sheets about 3 ft. × 8 ft. to be later employed as outer or surface sheets.

Three sheets of the paper prepreg as a core are sandwiched between two sheets of the woven glass fabric prepreg. A sheet of one ounce electrodeposited copper foil (also 3 ft. × 8 ft.) is placed over one of the glass prepregs, a polyvinyl fluoride (Tedlar, E.I. duPont) separator sheet (also 3 ft. × 8 ft.) is placed over the other glass prepreg. That pack or lay-up is placed between pressing plates and inserted between the heated platens of a hydraulic press. Several packs may be inserted into the press for greater output. The pack is heated for about one hour to a temperature of about 200°C, then colled for about one hour before removing from the press. The described procedure will produce a one-sixteenth inch copper clad laminate. The test results, together with the MIL-P-23949E specification, are summarized in Table I.

TABLE I

| Property | Conditioning | Example | Military Specification |
|---|---|---|---|
| Flexural Strength (PSI) | | | |
| Lengthwise | A | 60000 | 50000 min. |
| Crosswise | A | 45000 | 40000 min. |
| Volume Resistivity (megohms/cm) | C 96/35/90 | $1 \times 10^8$ | $10^6$ min. |
| Surface Resistance (megohms) | C 96/35/90 | $5 \times 10^5$ | $10^4$ min. |
| Water Absorption(%) | D 24/23 | .17 | .35 max. |
| Dielectric Breakdown(kv) | D 48/50 | >70 | 30 min. |
| Dielectric Constant | D 24/23 | 4.4 | 5.4 max. |
| Dissipation Factor | D 24/23 | .030 | .030 max. |
| Arc Resistance (sec) | D 48/50 | 90 | 60 min. |
| Blister (sec A 260°C) | | 60+ | 20 min. |
| Bond (lb./in. width) | | | |
| 1 ounce copper | A | 9.5 | 8 min. |
| 2 ounce copper | A | 13.0 | 11 min. |
| Flammability (sec) | A | 7 | 15 max. |

It should be noted that the Example 1 laminate meets the property requirements for FR4 laminates.

Additional evaluation of Example 1 samples indicates that they have a molded flatness at least equal to that obtained with an all woven glass fabric construction but more frequently better than the all glass fabric. The Example 1 samples were consistently better in that they did not warp and/or twist after solder float tests. The all glass fabric construction, indeed the known composite paper-fabric all glass constructions, usually do exhibit problems of warp and/or twist after solder floating or after other printed circuit processing steps involving rigorous environmental conditions, particularly high temperature conditions. The Example 1 samples are also consistently better than epoxy-paper base laminates in remaining flat after solder float or other high temperature processing steps. The punching, shearing, drilling and other machining qualities of Example 1 samples were better than the all glass fabric construction. Punched holes exhibited no cracking, crazing or haloing and had a hole quality suitable for plated through hole work, unlike the all glass fabric laminates. Drilled hole quality was also suitable for through plating with an increased stack of laminates able to be drilled compared to the all glass fabric laminate. Tool wear was evaluated as lower than that with any known all glass fiber construction. All of these advantages are obtained with a significantly lower material and/or processing cost than other laminates which provide only a portion of the described advantages.

The evaluation of other resin systems for the paper core prepregs indicates that the essential advantages may be obtained with other resins. The following examples are illustrative.

EXAMPLE 2

This example was identical to Example 1 except that an oil and epoxy modified phenolic resin was used for the second paper treatment in place of the solution of Epon 1001-A-80 and chlorendic anhydride. Some decrease in properties was noted but results indicate a large improvement over all paper base laminates with little effect on machinability.

EXAMPLE 3

This example was identical to Example 1 except that the brominated epoxy resin with the dicyandiamide hardener and the benzyl dimethylamine accelerator was used to treat both the paper and the woven glass fabric. Only a slight decrease in punch quality was detectable but the quality was suitable for through hole plating. Other properties were essentially the same.

EXAMPLE 4

This example was identical to Example 1 except that the first phenolic resin treatment was omitted. This change had an effect on the electrical properties of the laminate primarily because of the higher water absorption. This could be minimized by using a less dense and more open paper to get better wetting during the single treatment with epoxy resin.

Tests run on the laminates of Examples 2, 3 and 4 are summarized in Table II.

TABLE II

| Property | Example 2 | Example 3 | Example 4 |
|---|---|---|---|
| Flexural Strength (PSI) | | | |
| Lengthwise | 38534 | 53367 | 57403 |
| Crosswise | 28521 | 42729 | 44517 |
| Volume Resistivity (megohms/cm) | $3.5 \times 10^6$ | $1.9 \times 10^8$ | $1.3 \times 10^8$ |
| Surface Resistance (megohms) | $1.6 \times 10^5$ | $7.1 \times 10^5$ | $3 \times 10^3$ |
| Water Absorption (%) | .215 | .137 | .43 |
| Dielectric Breakdown(kv) | >35 | >60 | >60 |
| Dielectric Constant | 4.5 | 4.35 | 4.45 |
| Dissipation Factor | .028 | .030 | .044 |

The foregoing examples all employed the same number of core sheets and the same woven glass fabric. The following example employs a different construction.

EXAMPLE 5

This example was identical to Example 1 except that one sheet of the paper prepreg, instead of three, was employed as the core to produce a laminate having a nominal thickness of one thirty-seconds inch. Test results are summarized in Table III.

EXAMPLE 6

This example was identical to Example 1 except that five sheets of the paper prepreg, instead of three, was employed as the core to produce a laminate having a nominal thickness of three thirty-seconds inch. Test results are summarized in Table III.

Table III

| Property | Conditioning | Example 5 | Example 6 |
|---|---|---|---|
| Volume Resistivity | C-96/35/90 | $7.52 \times 10^7$ | $2.08 \times 10^8$ |
| Surface Resistivity | do. | $6.9 \times 10^5$ | $4.25 \times 10^6$ |
| Water Absorption | E-1/105+DES+ D-24/23 | .289 | .187 |
| Dielectric Breakdown | D-48/50+D-12/23 | 60 | 60 |
| Dielectric Constant | D-24/23 | 4.542 | 4.298 |
| Dissipation Factor | do. | .0306 | .0297 |
| Flexural Strength(W.G.) | A | 110,234 | 46,309 |
| Flexural Strength(C.G.) | A | 83,372 | 34,553 |

It should be noted that the 3/32 inch thick laminate of Example 6 falls below the minimum flexural strength requirements of MIL-P-13949E. These minimum requirements could be met, however, by increasing the proportion of the woven glass fiber sheet in the thickness of the laminate.

By eliminating the copper foil sheet and including a small amount of a proprietary additive catalyst (CA-T-10; Photocircuits Corporation) to the resin solutions of Example 1, an activated laminate suitable for additive processes, particularly through hole plating, is provided. Alternatively, or in addition thereto, an adhesive layer containing a catalyst or activator may be coated or applied to the unclad surface of the laminate. Such catalysts, activators, sensitizors and adhesive layers are known in the art and are described, for example, in U.S. Pat. No. 3,625,758; U.S. Pat. No. 3,600,330; U.S. Pat. No. 3,546,009; and U.S. Pat. No. 3,226,256; incorporated herein by reference. A phosphoric acid anodized aluminum foil sheet may be used in place of the copper foil. Etching away the anodized aluminum foil provides a surface which will bond to additive circuit deposits. The anodized foil is described in U.S. Pat. No. 3,620,933, also incorporated herein by reference.

What we claim is:

1. A high pressure laminate comprising the unitary bonded combination of (1) outer surface layers of an epoxy resin impregnated woven glass fabric and (2 ) a resin impregnated core layer consisting essentially of at least one saturating grade fibrous paper sheet, the sheet consisting essentially of water-laid fibrillated cellulosic fibers, said sheet sandwiched or disposed between said outer surface layers.

2. The laminate of claim 1 wherein an electrically conductive metal layer is bonded to at least one of said outer surface layers.

3. The laminate of claim 1 wherein copper foil is bonded to at least one of said outer surface layers.

4. The laminate of claim 1 wherein said core layer is a plurality of epoxy resin impregnated paper sheets, the cellulosic fibers consisting essentially of wood fibers having an average fiber length from about 0.5 to 5.0 mm.

5. The laminate of claim 4 wherein said paper sheets have a first deposit of phenolic resin and said epoxy resin is deposited thereover.

6. The laminate of claim 4 wherein said epoxy resin in the outer layers is hardened with dicyandiamide agent and said epoxy resins in the paper sheets is hardened with an anhydride hardening agent.

7. The laminate of claim 6 wherein the anhydride is chlorendic anhydride.

8. The laminate of claim 7 wherein the epoxy resin in the outer layers is a brominated epoxy resin.

9. The laminate of claim 4 further characterized by a nominal total thickness from about one thirty-second to one-eighth inch.

10. A high pressure laminate comprising the unitary bonded combination of outer layers of a woven glass cloth impregnated with an epoxy resin binder hardened with dicyandiamide and an inner core layer impregnated with an epoxy resin binder hardened with an anhydride hardening agent, said core layer comprising a plurality of fibrous paper sheets, the paper sheet fibers consisting essentially of water-laid fibrillated cellulosic fibers having an average length from about 0.5 to 5 mm.

11. A high pressure laminate comprising the unitary bonded combination of (1) outer surface layers of a DGEBA epoxy resin impregnated woven glass fabric and (2) a DGEBA epoxy resin impregnated core layer consisting essentially of at least one saturating grade fibrous paper sheet, the sheet consisting essentially of fibrillated water-laid cellulosic fibers, said core layer sandwiched or disposed between said outer surface layers.

12. The laminate of claim 11 wherein the cellulosic fibers are wood fibers having average fiber length from about 0.5 to 5.0 mm.

13. The laminate of claim 11 wherein the epoxyresin in the core layer is cross-linked with an anhydride cross-linking agent.

14. The laminate of claim 13 wherein the anhydride is chlorendic anhydride.

15. The laminate of claim 11 wherein copper foil is bonded to at least one of said outer surface layers.

* * * * *